United States Patent [19]

Nylund

[11] Patent Number: 5,227,130
[45] Date of Patent: Jul. 13, 1993

[54] FUEL ASSEMBLY FOR NUCLEAR REACTOR

[75] Inventor: Olov Nylund, Västerås, Sweden

[73] Assignee: ABB Atom AB, Västerås, Sweden

[21] Appl. No.: 817,639

[22] Filed: Jan. 7, 1992

[30] Foreign Application Priority Data

Feb. 5, 1991 [SE] Sweden .............................. 9100343

[51] Int. Cl.⁵ ................................................ G21C 3/34
[52] U.S. Cl. ..................................... 376/438; 376/439; 376/462
[58] Field of Search .............. 376/438, 439, 446, 434, 376/448, 440, 442, 462, 363; 976/DIG. 152, DIG. 71, DIG. 60

[56] References Cited

U.S. PATENT DOCUMENTS

| 4,142,934 | 3/1979 | Wild | 376/434 |
| 4,416,852 | 11/1983 | Nylund | 376/438 |
| 4,514,358 | 4/1985 | Borrman et al. | 376/362 |
| 4,585,614 | 4/1986 | Helmersson | 376/434 |
| 4,762,669 | 8/1988 | Doshi | 376/442 |
| 4,826,653 | 5/1989 | Nylund | 376/444 |

Primary Examiner—Donald P. Walsh
Assistant Examiner—Meena Chelliah
Attorney, Agent, or Firm—Watson, Cole, Grindle & Watson

[57] ABSTRACT

A fuel assembly (1) for a nuclear reactor of pressurized-water type with a number of fuel rods (2) retained into a bundle by means of spacers (3) between a top nozzle (4) and a bottom nozzle (5) which includes a plurality of openings for a coolant flow to the fuel rods (2). A partial fuel box (7) is providing at at least the lower part of the fuel assembly and extending from the bottom nozzle (5) and at least up past the lowermost ordinary spacer (3) of the bundle.

7 Claims, 3 Drawing Sheets

FUEL ASSEMBLY FOR NUCLEAR REACTOR

BACKGROUND OF THE INVENTION

The present invention relates to a fuel assembly for a nuclear reactor of pressurized-water type. Such a fuel assembly of a known design comprises a plurality of fuel rods held together into a bundle by means of spacers arranged along the fuel rods as well as guide tubes arranged between the fuel rods and fixed to the spacers. The bundle is arranged between a top nozzle and a bottom nozzle. These are provided with a plurality of openings for the coolant flow which is to pass through the fuel assembly. The fuel assembly has no surrounding casing at all, a so-called fuel box, with which the fuel assemblies in a boiling-type nuclear reactor are provided.

It is further known to throttle the coolant flow to the most burnt-up fuel assemblies in a nuclear reactor to be able, in the case of an unchanged total coolant flow through the reactor core, to increase the coolant flow to the less burnt-up fuel assemblies and hence to be able to absorb more power from these. The throttling normally takes place at the openings of the bottom and/or top nozzle, either manually during refuelling or by some form of automatic means. This type of control is effective for fuel assemblies provided with fuel boxes but less effective in the case of boxless fuel assemblies for a pressurized-water reactor. This is due to the fact that the coolant flow may divert in the lateral direction over to adjacently positioned fuel assemblies. Since particularly in highly loaded fuel assemblies there is a tendency for steam formation on the fuel rods and thus higher resistance to the passage of the coolant flow than in fuel assemblies subjected to lower load, the coolant flow has a tendency to pass from fuel assemblies subjected to higher load to those subjected to lower load even at a relatively short distance from the bottom nozzles of the assemblies when throttling the coolant flow in the fuel assemblies subjected to lower load.

SUMMARY OF THE INVENTION

According to the invention, now at least the lower part of the fuel assembly is provided with a partial fuel box which surrounds the bundle and extends from the bottom nozzle and at least up past the lowermost, ordinary spacer of the bundle. The box should have a length which is smaller than the length of the bundle and preferably smaller than half the length of the bundle.

The partial fuel box means that the control of the coolant flow to low-load fuel assemblies may be performed with a considerably improved effect. At the same time, the reactivity load of the box is small, particularly if the box is made shorter than half the length of the bundle.

An even better result is obtained if also the upper part of the fuel assembly is provided with a partial fuel box. A suitable length of the two fuel boxes may then be for them to extend from a top or bottom nozzle and covering two of the adjacent ordinary spacers of the bundle. A control of the coolant flow by throttling of the opening in the top or bottom nozzle will now be considerably more effective than when there are no fuel boxes at all.

BRIEF DESCRIPTION OF THE DRAWINGS

The invention wi most readily understood with reference to the accompanying FIGS. 1-7, wherein.

DETAILED DESCRIPTION OF THE PREFERRED EMBODIMENT

Figure 1:
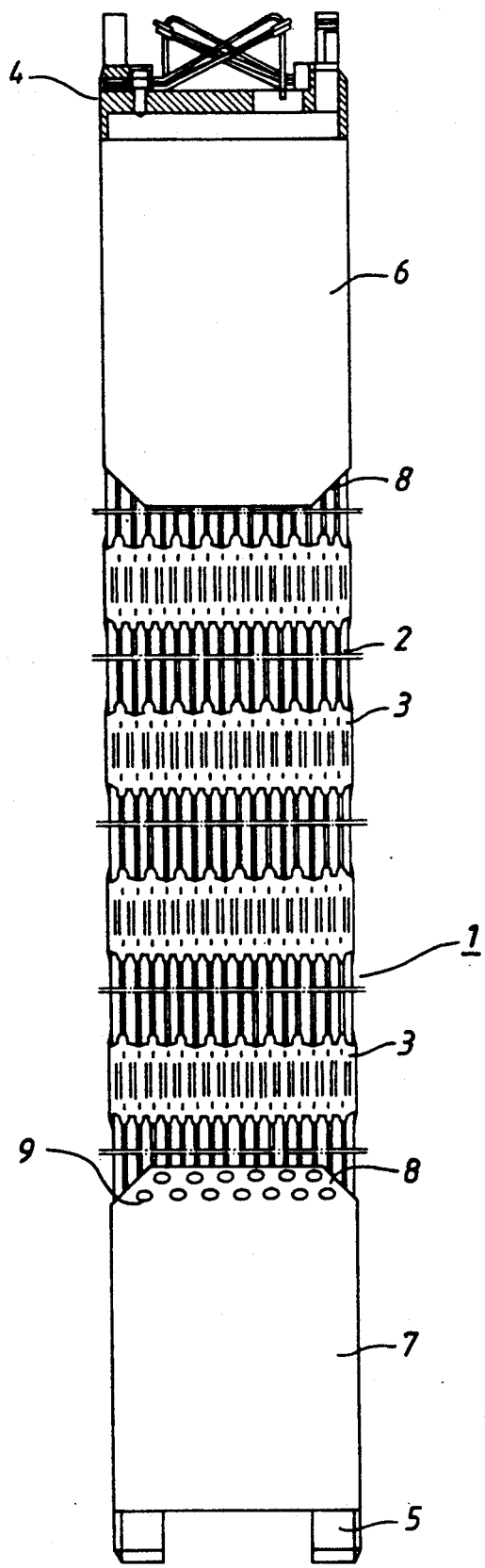
FIG. 1 shows a fuel assembly provided with partial fuel boxes.

In FIG. 1, 1 designates a fuel assembly for a pressurized-water reactor. The fuel assembly 1 comprises a number of fuel rods 2 as well as guide tubes (not shown). These are retained into a bundle by spacers 3. The bundle is arranged between a top nozzle 4 and a bottom nozzle 5, which are provided with openings (not shown) for the coolant flow through the fuel assembly 1. How these openings can be throttled in order to control the coolant flow through them is shown in Swedish patent specification 8801141-6. According to the invention, the fuel assembly 1 has been provided with partial fuel boxes 6 and 7, each of which, according to FIG. 1, extending in over two ordinary spacers 3. The fuel boxes 6, 7 have been provided with bevelled corners 8 to prevent the fuel boxes 6, 7 from hooking into adjacent fuel assemblies 1. The lower fuel box 7 has been provided with a number of holes 9 at its upper edge to equalize the difference in cooling water pressure inside the fuel assembly when changing from a partial box to a boxless state.

Figure 2:
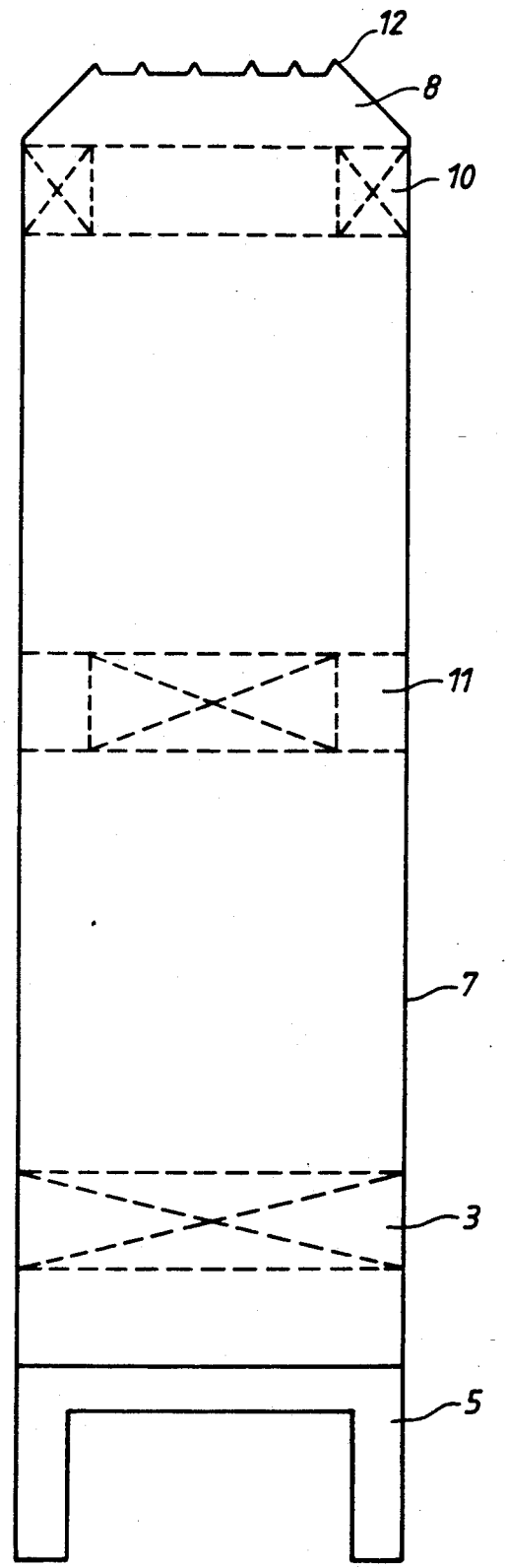
FIG. 2 shows the lower partial fuel box with spacers enclosed therein, of which some are so-called partial spacers.

FIG. 2 shows the lower part of the fuel assembly 1 which is enclosed by a partial fuel box 7. This fuel box 7 is intended to comprise two ordinary spacers 3 but the upper one of them has been replaced by two partial spacers 10, 11 of the type described in more detail in Swedish patent 8802305-6. These spacers 10, 11 are welded to the box wall and at the same time constitute an inner support for the walls of the partial fuel box 7, which walls are conceived to be made from thin plate of Zircaloy (~1 mm). Thus, the box walls are conceived to serve as spacer frames. Otherwise, the upper part of the box walls is provided with inwardly-bent studs 12 to facilitate withdrawal of the fuel assembly 1 from the reactor core.

Figure 3:
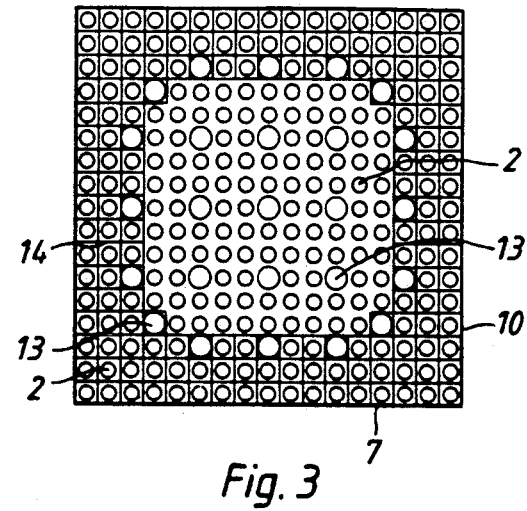
FIGS. 3 and 4 show these partial spacers.

FIG. 3 shows the peripheral partial spacer 10 seen from above and containing fuel rods 2 and guide tubes 13. In the spacer 10 only the outer fuel rods 2 and the guide tubes 13 are fixed in a lattice-work 14 whereas the fuel rods 2 and the guide tubes 13 in the centre of the bundle freely pass through the spacer 10. The frame of the spacer 10 is formed by the wall of the fuel box 7.

Figure 4:
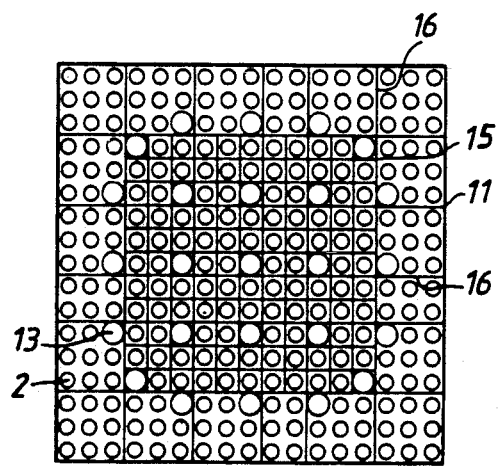

FIG. 4 shows the central partial spacer 11. In this, only the centrally located fuel rods 2 and guide tubes 13 of the bundle are fixed in a lattice-work 15. Certain of the crossing plates 16 forming this central lattice 15 are extended to the walls of the surrounding fuel box 7 and fixed therein as support for the walls. When need arises, additional partial spacers may be arranged between the spacers 10 and 11 and the spacers 11 and 3, respectively, as support for the walls of the box 7. It would also be possible to arrange a simpler form of support structure at these locations.

Figure 5:
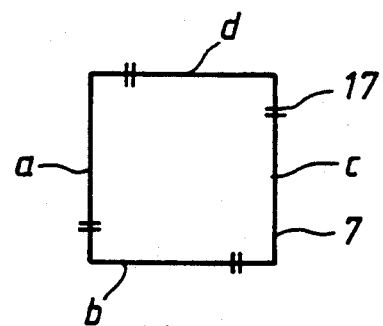
FIGS. 5, 6 and 7 show how the partial fuel boxes have been perforated to facilitate rod inspection and to achieve a certain pressure equalization between the outside and inside of the box.
Figure 6:
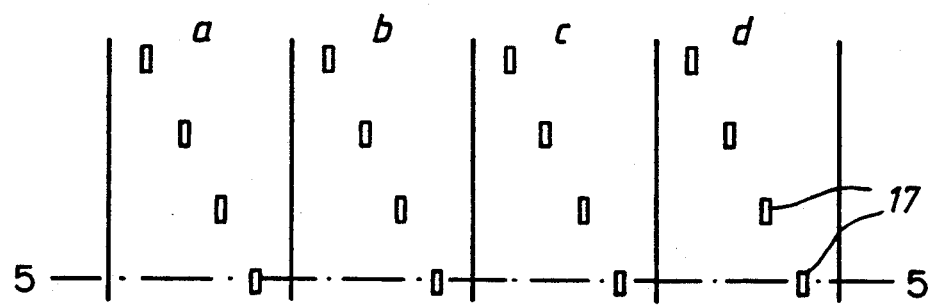
Figure 7:
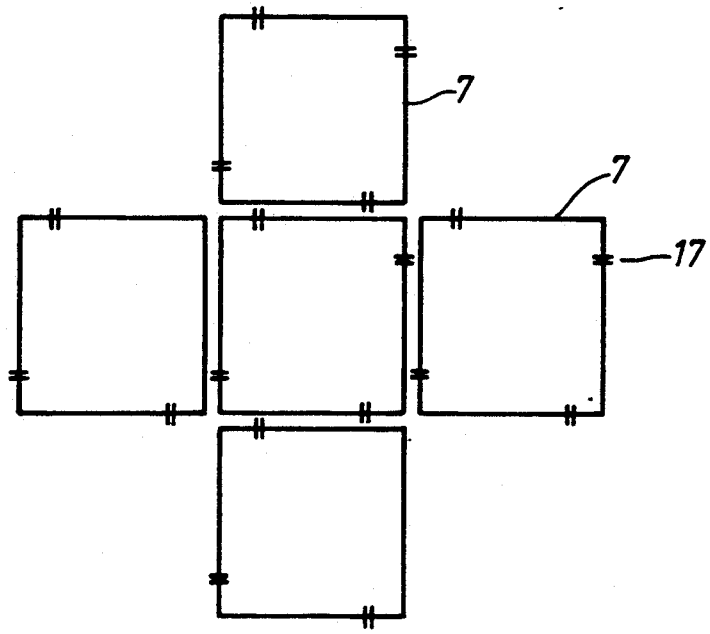

FIG. 5 shows a partial fuel box 7 seen from above in a section 5—5 in FIG. 6 which shows the walls of the fuel box 7 unfolded into a plane surface. The walls in FIGS. 5 and 6 have given the corresponding designations a, b, c, d. The figures show how a fuel box 7 can be perforated with holes 17. These holes 17 are intended to facilitate ocular inspection of the bundle inside the box walls and also to reduce the pressure difference on each side of the walls of a single fuel box. FIGS. 5-7 also show how the holes 17 are to be placed to prevent them from getting just opposite to each other when several partial fuel boxes 7 are placed adjacent to each other, as shown in FIG. 7.

If the coolant flow in the fuel assembly 1 is throttled, the partial fuel boxes 6, 7 now prevent the coolant flow from adjacent unthrottled fuel assemblies from flowing over to the fuel assembly 1 already in the vicinity of the bottom nozzle 5. With both the partial fuel boxes 6, 7 in position, passage of coolant flow between adjacent fuel assemblies can only take place in the open area between the inlet box 7 and the outlet box 6. The effect of the inlet throttling is thus moved upwards and the effect of the outlet throttling is moved downwards in the bundle such that the cooling of the unthrottled highly loaded assemblies is considerably improved.

I claim:

1. A fuel assembly (1) for a nuclear reactor of pressurized-water type, comprising a number of fuel rods (2) which are retained into a bundle by means of spacers (3) arranged along the fuel rods (2) as well as a top nozzle (4) and a bottom nozzle (5) between the fuel rods (2), between which the guide tubes (13) with associated fuel rods (2) are fixed, said top nozzle (4) and bottom nozzle (5) being provided with a plurality of openings for a coolant flow to the fuel rods (2), wherein at least the lower part of the fuel assembly (1) is provided with a partial fuel box (7) surrounding the bundle and extending from the bottom nozzle (5) and at least up past the lowermost, ordinary spacer (3) of the bundle, however with a length smaller than half the length of the bundle.

2. A fuel assembly (1) according to claim 1, wherein also the upper part of the fuel assembly (1) is provided with a partial fuel box (6) extending from the top nozzle (4) and at least down past the uppermost, ordinary spacer (3) of the bundle.

3. A fuel assembly (1) according to claim 1, wherein the partial fuel boxes (6, 7) at the same time constitute a frame for the spacers they surround.

4. A fuel assembly (1) according to claim 1, wherein the walls of the partial boxes (6, 7) are also retained by partial spacers (10, 11).

5. A fuel assembly (1) according to claim 1, wherein the walls of the partial fuel boxes (6, 7) are provided with a number of holes (6).

6. A fuel assembly (1) according to claim 5, wherein the holes (17) in the wall of a fuel box (6, 7) are arranged displaced in relation to the holes (17) in an adjacent wall of another fuel box (6, 7) in the reactor core.

7. A fuel assembly (1) according to claim 1, wherein the openings in the top and/or bottom nozzle (4, 5) are provided with manually or automatically actuated throttling members for control of the coolant flow through the fuel assembly (1).

* * * * *